(12) United States Patent
Ide

(10) Patent No.: US 8,595,155 B2
(45) Date of Patent: Nov. 26, 2013

(54) KERNEL REGRESSION SYSTEM, METHOD, AND PROGRAM

(75) Inventor: Tsuyoshi Ide, Kanagawa-ken (JP)

(73) Assignee: International Business Machines Corporation, Armonk, NY (US)

(*) Notice: Subject to any disclaimer, the term of this patent is extended or adjusted under 35 U.S.C. 154(b) by 258 days.

(21) Appl. No.: 13/053,616

(22) Filed: Mar. 22, 2011

(65) Prior Publication Data

US 2011/0238606 A1 Sep. 29, 2011

(30) Foreign Application Priority Data

Mar. 23, 2010 (JP) ................................. 2010-065634

(51) Int. Cl.
*G06F 15/18* (2006.01)
(52) U.S. Cl.
USPC .............................................................. 706/12
(58) Field of Classification Search
None
See application file for complete search history.

(56) References Cited

U.S. PATENT DOCUMENTS

| 7,636,651 | B2* | 12/2009 | Bishop et al. .................... 703/2 |
| 2005/0119534 | A1 | 6/2005 | Trost | |
| 2008/0025627 | A1* | 1/2008 | Freeman et al. .............. 382/255 |
| 2010/0039427 | A1* | 2/2010 | Yun, II .......................... 345/419 |
| 2010/0179934 | A1* | 7/2010 | Howley et al. .................. 706/12 |
| 2012/0201096 | A1* | 8/2012 | Valero et al. .................... 367/81 |

FOREIGN PATENT DOCUMENTS

| JP | 2007-122416 | 5/2007 |
| JP | 2008-502371 | 1/2008 |
| WO | WO 2005039388 A2 | 5/2005 |
| WO | WO 2005039388 A3 | 5/2005 |

\* cited by examiner

*Primary Examiner* — Kakali Chaki
*Assistant Examiner* — Mario Riojas Ramirez
(74) *Attorney, Agent, or Firm* — F. Chau & Associates, LLC; Gail H. Zarick, Esq.

(57) ABSTRACT

In training data, a similarity matrix is generated for each of types of data corresponding to different kernels, and graph Laplacians are formed individually from the similarity matrices. An entire graph Laplacian is defined as linear combination of the individual graph Laplacians with coupling constants. Observation variables and latent variables associated therewith are assumed to form normal distributions, and the coupling constants are assumed to form a gamma distribution. Then, on the basis of a variational Bayesian method, a variance of the observation variables and the coupling constants can be figured out with a reasonable computational cost. Once the variance of the observation variables and the coupling constants are figured out, a predictive distribution for any input data can be figured out by means of a Laplace approximation.

9 Claims, 8 Drawing Sheets

KERNEL REGRESSION SYSTEM, METHOD, AND PROGRAM

CROSS-REFERENCE TO RELATED APPLICATION

This application claims priority under 35 U.S.C. §119 from Japanese Patent Application No. 2010-65634, filed Mar. 23, 2010, the entire contents of which are incorporated herein by reference.

BACKGROUND OF THE INVENTION

The present invention relates to a machine learning method, and particularly to a kernel regression method, and more particularly to a multiple kernel regression method.

In recent years, kernel regression methods have been employed to predict, for example, a cost (e.g., time) required to travel a certain route. As described in the description in Japanese Patent Application No. 2008-240351, the present inventors conceived a method to predict a time required to travel a certain route on a map through Gaussian process regression using a string kernel for describing the similarity (kernel function) between given routes. The string kernel has the length of a substring as a parameter. By studying the correlation between the string kernel and the travel time, the present inventors came to the realization that the travel time can be assumed as the integration of the contributions of substrings with various lengths and therefore that it is more desirable to create a prediction model based on multiple kernel function.

A method to estimate optimum design parameters of a vehicle is another field of application. At the design and development stage of a vehicle, it is necessary to find design parameters that satisfy a requirement for a desired strength while minimizing the cost. The work of finding such design parameters is generally done through simulations as the primary work and actual vehicle tests as the supplementary work. In this case, it is important to figure out the dependence of an objective function (e.g., the maximum impact to be applied on the human body) on the design parameters from limited experimental points. Figuring out the dependence leads to a solution as to how to modify the current parameters to further improve the current parameters. In general, the dependence is non-linear, and thus kernel regression is preferable in this case as well. However, the design parameters include various physical quantities. Hence, with a single kernel function, it is difficult to perform accurate modeling. Accordingly, it is desirable to divide the parameters into groups of the respective physical quantities and use multiple kernel functions that are appropriate to these groups.

Another example is the calculation of sales-potential scores of corporate clients. Specifically, companies as potential clients are each expressed in association with a set of numeral values of certain attributes. For example, each of such companies is expressed in an attribute vector by using managerial indices such as a profit margin, the number of employees, the levels of penetration of other competitors, indices indicating the past purchase history and the type of business, and the like. Then, the priority in sales action is calculated as a certain real value by using data on companies, on which sales actions have been taken, as training data while considering the past record of sales and the salesperson's feeling. Using the thus calculated information, one can desire to figure out how much potential an unknown company has as a client. In this case, the relation between the attribute and the potential should also appear non-linearly, and therefore use of kernel regression is desirable. However, the attributes indicating the companies include quantities different from each other in nature. Hence, in this case too, it is desirable to use multiple kernel functions appropriate for those respective quantities different in nature.

As can be understood from the above examples, the multiple kernel function learning method can be said to be one of the most common methods to handle diversity and variety of data in the real world.

Japanese Patent Application Publication No. 2007-122418 discloses a prediction method including: a read step of reading, from a database, learning data that is a set of samples each having multiple explanatory variables and a dependent variable showing whether the sample is in a certain state or not; a coefficient calculation step of calculating a regression coefficient in a regression formula by optimizing an objective function given beforehand using the learning data, the regression formula being defined by using a kernel function as the sum of component kernel functions prepared for the respective explanatory variables; a dependent-variable calculation step of calculating a dependent variable by inputting the multiple explanatory variables as input parameters into the regression formula; and a probability prediction step of predicting either the probability of the sample being in the certain state or the probability of the sample not being in the certain state, by inputting the calculated dependent variable into a probability prediction function. The kernel function used in the method is also a type of the multiple kernel function as it is the sum of the component kernel functions prepared for the explanatory variables.

It should be noted that the multiple kernel function learning method heretofore has a difficulty in calculating a problem in a practical size, due to its large computational cost.

SUMMARY OF THE INVENTION

It is an object of the present invention to provide a multiple kernel function learning method requiring only a reasonable computational cost to handle a problem in a practical size.

Accordingly, one aspect of the present invention provides a kernel regression learning method for calculating an estimation value including the steps of: calculating a similarity matrix for each of the different types of observation data; calculating a graph Laplacian for each of the different types of observation data by use of the corresponding similarity matrix calculated; providing an entire graph Laplacian as linear combination of the graph Laplacians with coupling constants; and calculating the coupling constants and a variance of an observation model of the observation data by use of a variational Bayesian method with the graph Laplacian, wherein the observation model is a normal distribution, latent variables for explaining the observation data form a normal distribution, and the coupling constants follow a gamma prior distribution, and wherein at least one of the steps is carried out by a computer device.

Another aspect of the present invention provides a kernel regression learning system including: a means for calculating a similarity matrix for each of the different types of observation data; a means for calculating a graph Laplacian for each of the different types of observation data by use of the corresponding similarity matrix; a means for providing an entire graph Laplacian as linear combination of the graph Laplacians with coupling constants; and a means for calculating the coupling constants and a variance of an observation model of the observation data by use of a variational Bayesian method with the graph Laplacian, wherein the observation model is a normal distribution, latent variables for explaining the observation data form a normal distribution, and the coupling constants follow a gamma prior distribution.

Another aspect of the present invention provides a computer readable storage medium tangibly embodying a computer readable program code having computer readable instructions which, when implemented, cause a computer to carry out the steps of: calculating a similarity matrix for each of the different types of observation data; calculating a graph Laplacian for each of the different types of observation data by use of the corresponding similarity matrix calculated; providing an entire graph Laplacian as linear combination of the graph Laplacians with coupling constants; and calculating the coupling constants and a variance of an observation model of the observation data by use of a variational Bayesian method with the graph Laplacian, wherein the observation model is a normal distribution, latent variables for explaining the observation data form a normal distribution, and the coupling constants follow a gamma prior distribution.

DETAILED DESCRIPTION OF THE PREFERRED EMBODIMENTS

Figure 1:
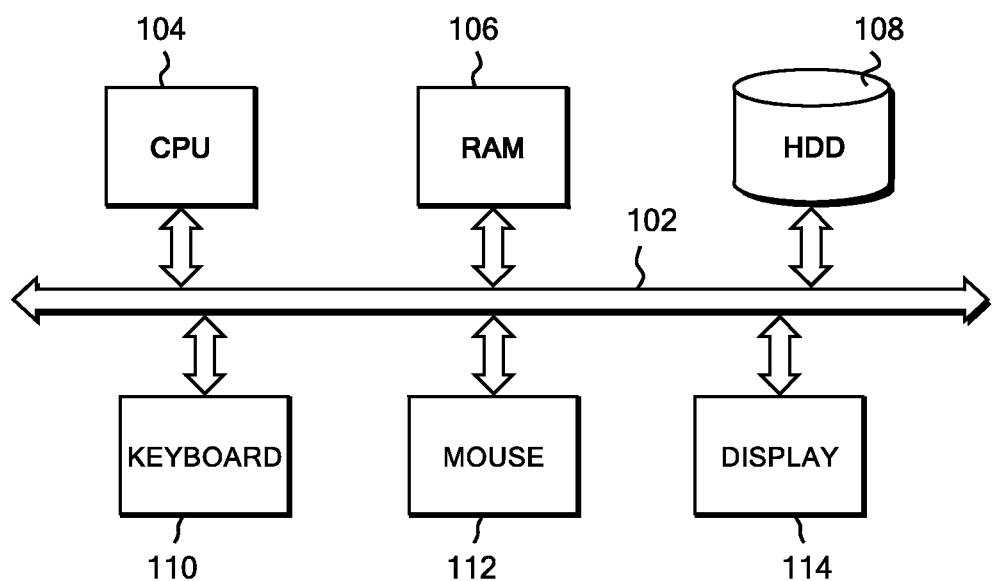
FIG. 1 is a block diagram showing an exemplary hardware configuration for carrying out the present invention.

Hereinbelow, embodiments of the present invention will be described by referring to the drawings. It is to be understood that these embodiments are to explain some preferred modes of the present invention and are not intended to limit the scope of the invention to what will be described herein. In addition, reference numerals that are the same across the drawings below represent the same components unless otherwise noted.

The present invention handles data obtained by applying each of multiple types of time-series data to each of filtering processes differing from each other, for example. These types of data can be, for example, data described above, i.e., data of the optimum design parameters of a vehicle acquired through tests. Also, filters/filtering processes refer, for example, to a low-pass filter used to remove noises, a high-pass filter used to remove trend components, interpolation, piecewise linear approximation, and the like.

Now, the output of the q-th filter for the i-th time-series data is expressed as $x^{(i)}_{q,t}$, where t is the time index. Also, each time-series data is assumed to contain T pieces of data along the time axis. Then, the output of the q-th filter is represented by a T-dimensional vector $$x^{(i)}_q = [x^{(i)}_{q,1}, x^{(i)}_{q,2}, \ldots, x^{(i)}_{q,T}]^T,$$

where a superscript T on the vector is a symbol representing transpose.

Here, a similarity matrix $A^q$ is defined as one whose components (i, j) indicate the similarity between $x^{(i)}_q$ and $x^{(j)}_q$ in a certain aspect. Possible examples include the inner product of a Euclidean space, a conversion thereof by use of a monotonically increasing function, and various other things. Here, such diversity is implemented on the filter side, and the similarity matrix $A^q$ in the simplest case is defined as follows.

$$A^q_{i,j} \equiv \sum_{t=1}^{T} x^{(i)}_{q,t} x^{(j)}_{q,t} \qquad \text{[Formula 1]}$$

As can be understood from the definition, the similarity matrix $A^q$ is an N×N matrix, where N is the number of time-series given as samples.

According to the present invention, with this similarity matrix, a graph Laplacian L is defined as described below.

$$L^q_{i,j} \equiv \sum_{l=1}^{N} A^q_{i,l} \delta_{ij} - A^q_{i,j} \qquad \text{[Formula 2]}$$

$$L \equiv \sum_{q=1}^{M} u_q L^q,$$

where δ is the Kronecker delta, and $u_q$ is a coupling constant and determined based on data as described below.

The present invention aims to optimize the coupling constants $\{u_q\}$ based on training data. Once the coupling constants $\{u_q\}$ are optimized, a similarity matrix A as described below can be obtained as linear combination of M similarity matrices.

$$A \equiv \sum_{q=1}^{M} u_q A^q \qquad \text{[Formula 3]}$$

According to the findings by the present invention, it is possible to identify the optimal form of similarity with the need of only a reasonable computational cost by assuming a probability model for observation variables, latent variables associated therewith, and the coupling constants by performing optimization based on a variational Bayesian method.

What is assumed here is a natural assumption as below:

The observation model is a normal distribution with a variance $\beta^{-1}$;

The latent variables for explaining the observation values also form a normal distribution; and The coupling constants $\{u_q\}$ follow a gamma prior distribution.

When β and the coupling constants $\{u_q\}$ are estimated from data through point estimation, a distribution of outputs for any input can be calculated.

In accordance with the present invention, it is possible to provide a multiple kernel function learning method requiring only a reasonable computational cost to handle a problem in a practical size through computer processing.

Referring to FIG. 1, there is shown a block diagram of computer hardware for implementing a system configuration and processing according to an embodiment of the present invention. In FIG. 1, a CPU 104, a main memory (RAM) 106, a hard disk drive (HDD) 108, a keyboard 110, a mouse 112, and a display 114 are connected to a system bus 102. The CPU 104 is preferably one based on a 32-bit or 64-bit architecture. For example, Pentium (trademark) 4 of Intel Corporation, Core (trademark) 2 Duo of Intel Corporation or Athlon (trademark) of AMD can be used for the CPU 104. The main memory 106 is preferably one having a capacity of 1 GB or larger, and more preferably one having a capacity of 2 GB or larger.

The hard disk drive 108 stores an operating system therein. This operating system can be any operating system that is compatible with the CPU 104, such as Linux (trademark), Windows (trademark) 7, Windows XP (trademark), or Windows (trademark) 2000 of Microsoft Corporation, or Mac OS (trademark) of Apple Inc.

The hard disk drive 108 also stores therein training data in a predetermined data format. This training data includes time-series data sequences obtained by filtering each of multiple types of time-series data through different filters. In this embodiment, these types of time-series data are time-series data acquired from various sensors through simulations on a vehicle at the design and development stage.

The hard disk drive 108 also stores therein: a regression parameter calculation program of multiple kernel functions according to the present invention; and a program that performs regression calculation using kernel regression on the basis of the calculated parameters. These programs can be created with a programming language processing system of any known programming language, such as C, C++, C#, or Java (trademark). The programs will be described later in detail by referring to the functional block diagram in FIG. 2 and the subsequent diagrams.

The keyboard 110 and the mouse 112 are used for the operation of graphic objects, such as icons, taskbars, and windows. The graphic objects are displayed on the display 114 in accordance with a graphic user interface provided by the operating system. The keyboard 110 and the mouse 112 are also used for such operations as the importing of acquired time-series data and the starting and ending the programs according to the embodiment of the present invention.

The display 114 is preferably but not limited to a 32-bit true-color LCD monitor with a resolution of 1024×768 or higher. The display 114 is used to display an image such as a map including routes for which costs such as required time is to be predicted.

Figure 2:
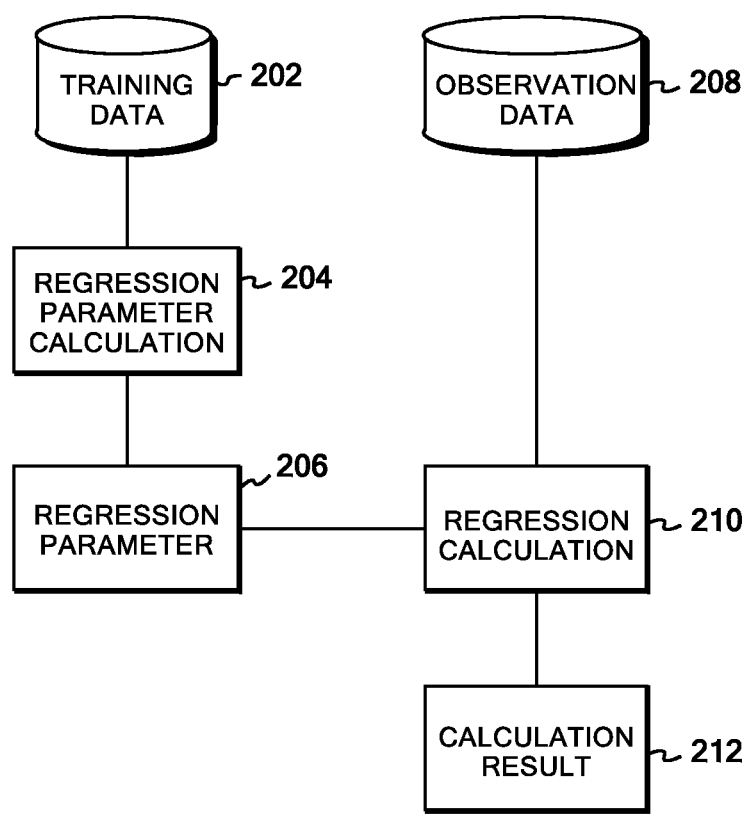
FIG. 2 is a block diagram showing a functional logic according to an embodiment of the present invention.

FIG. 2 shows a functional block diagram according to the embodiment of the present invention. In the embodiment, training data 202 contains data on the vehicle's optimum design parameters obtained from tests. The data is filtered such that N types of time-series data are each converted by M filters.

So, the output of the q-th filter for the i-th time-series data is expressed as $x^{(i)}_{q,t}$. Also, each time-series data contains T pieces of data along the time axis. Then, $$x^{(i)}_q = [x^{(i)}_{q,1}, x^{(i)}_{q,2}, \ldots, x^{(i)}_{q,T}]^T,$$

where a superscript T on the vector is a symbol representing transpose.

Figure 3:
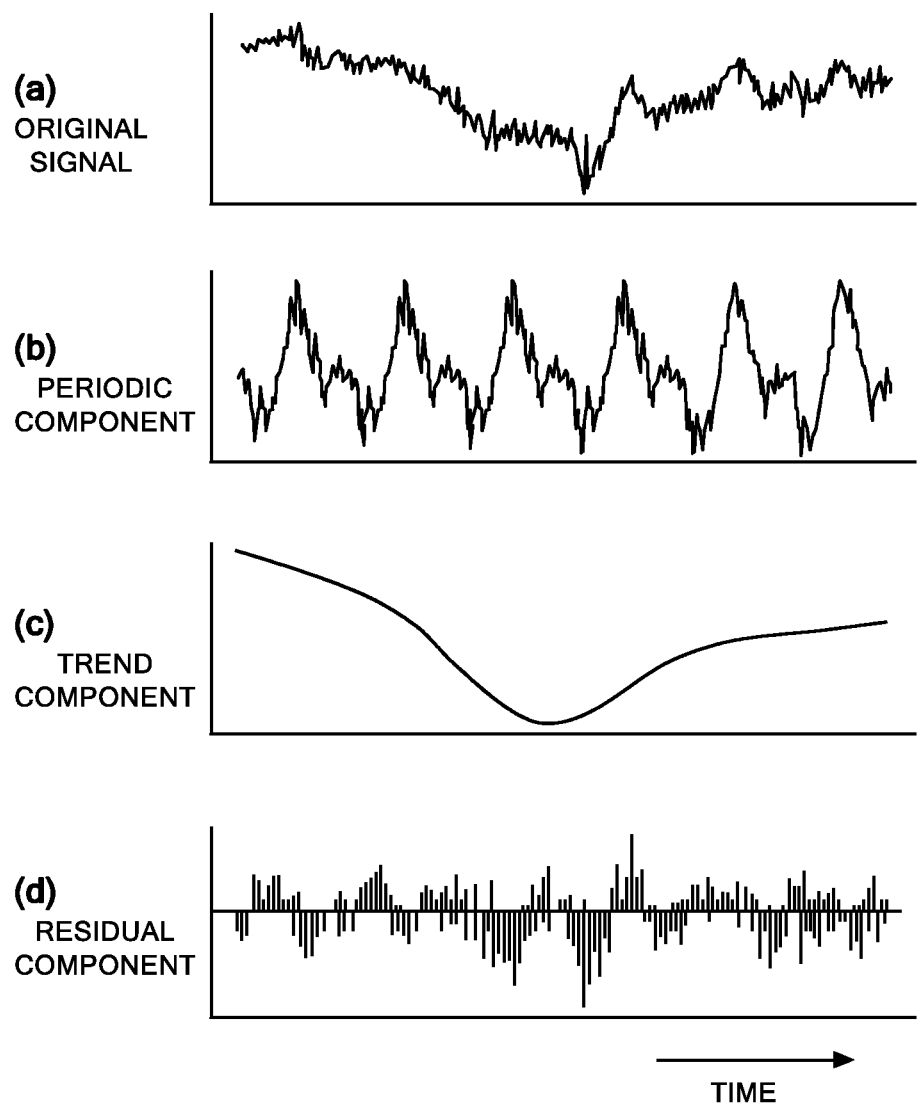
FIG. 3(a) is a graph showing a waveform of time-series data of an original signal before being filtered.
FIG. 3(b) is a graph showing a waveform of time-series data after the signal is filtered to extract periodic components.
FIG. 3(c) is a graph showing a waveform of time-series data after the signal is filtered to extract trend components.
FIG. 3(d) is a graph showing a waveform of time-series data after the signal is filtered to extract residual components.

FIGS. 3(a) to 3(d) show examples of the filtering processes. FIG. 3(a) shows time-series data of an original signal before being filtered. FIG. 3(b) is time-series data after the signal is filtered to extract periodic components. FIG. 3(c) is time-series data after the signal is filtered to extract trend components. FIG. 3(d) is time-series data after the signal is filtered to extract residual components.

The training data 202 contains evaluation values $y_N = [y^{(1)}, y^{(2)}, \ldots, y^{(N)}]^T$. These are a sequence of evaluation values corresponding to the individual time-series data pieces in the training data 202. The evaluation values $y_N$ can be calculated from test results based on a predefined formula, or determined by using some measurement tools.

The training data 202 is stored in the hard disk drive 108 in a known appropriate data format, such as CSV or XML.

A regression parameter calculation module 204 receives the training data 202, and outputs a regression parameter 206 including a variance β of an observation model and the mode value of coupling constants u. The regression parameter 206 is stored preferably in a predetermined area in the main memory 106, but can be included in a predetermined file in a predetermined area in the hard disk drive 108. The regression parameter calculation module 204 will be described later in detail by referring to the flowcharts in FIGS. 4 to 7.

Observation data 208 is preferably time-series data measured by using the same sensors used to measure the training data 202. The observation data 208 is also stored in the hard disk drive 108 in the known appropriate data format, such as CSV or XML.

A regression calculation module 210 refers to the training data 202 and the regression parameter 206 calculated by the regression parameter calculation module 204, and provides a predictive distribution of the evaluation values corresponding to the observation data 208 as a calculation result 212. This calculation result can be processed by an appropriate visualization tool (not illustrated) and displayed on the display 114 in the form of a table, a line graph and/or the like.

Figure 4:
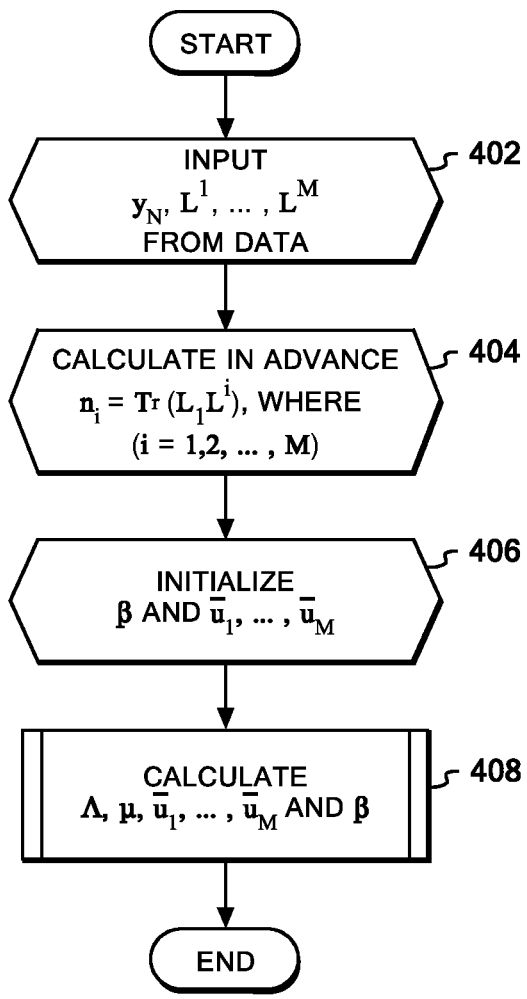
FIG. 4 is a diagram showing a flowchart of regression parameter processing.

Next, processing performed by the regression parameter calculation module 204 will be described by referring to the flowcharts in FIGS. 4 to 6. In particular, FIG. 4 is a flowchart showing the overview of the regression parameter calculation processing.

Note that, in order to perform the calculation to be described below, the following model is assumed in the embodiment:

The distribution of errors in the observation process of the evaluation values is a normal distribution with a variance $\beta^{-1}$;

The observation values are generated by latent variables, and their distribution is also a normal distribution; and The coupling constants $\{u_p\}$ follow a gamma distribution as a prior distribution.

When $\{u_p\}$ are expressed collectively as u as a vector, the gamma distribution of u is as below:

$$p(u) = \prod_{i=1}^{M} g(u_i \mid \nu/2, \nu/2) \quad \text{[Formula 4]}$$

$$g(u_i \mid \nu/2, \nu/2) \equiv \frac{1}{\Gamma\left(\frac{\nu}{2}\right)} \left(\frac{\nu}{2}\right)^{\frac{\nu}{2}} u_i^{\frac{\nu}{2}-1} \exp\left(-\frac{\nu u_i}{2}\right),$$

where ν is an appropriate value selected in advance (about 1, for example).

The gamma distribution is known as a natural conjugate prior distribution for the variance of an exponential distribution. Thus, it is known that choosing a natural conjugate distribution as a prior distribution makes later calculations easier significantly. For this reason, it is advantageous to choose gamma distribution as the prior distribution. Note that choosing a gamma distribution involves almost no loss of generality. This is because the coupling constants are required to take no negative values due to the definition thereof, and are expected to have a sharp peak about a specific value if the modeling is fine. In other words, the distribution can be expected to be monomodal. Thus, in view of usability in practical cases, the gamma distribution is perhaps the only one distribution satisfying these conditions.

At Step 402 in FIG. 4, the evaluation values $y_N$ and $L^1, \ldots, L^M$ in the training data 202 are inputted to the regression parameter calculation module 204.

Here, $L^q$ (q=1, 2, ..., M) is defined as follows (Note that the q is not an exponent but a superscript):

$$A_{i,j}^q \equiv \sum_{t=1}^{T} x_{q,t}^{(i)} x_{q,t}^{(j)} \qquad \text{[Formula 5]}$$

$$L_{i,j}^q \equiv \sum_{l=1}^{N} A_{i,l}^q \delta_{ij} - A_{i,j}^q.$$

Specifically, $L^q$ is a graph Laplacian generated from a similarity matrix $A^q$, whose (i,j) element is the similarity between the i-th time-series data and the j-th time-series data calculated by using the q-th filter. The similarity matrix $A^q$ is an N×N matrix, and therefore $L^q$ is also an N×N matrix.

At Step 404, the regression parameter calculation module 204 calculates $n_i = Tr(L_1 L^i)$, where i=1, 2, ..., M.

Here, $L_1$ is defined as below:

$$L_1 \equiv \sum_{q=1}^{M} L^q. \qquad \text{[Formula 6]}$$

In addition, Tr is the trace of the matrix, i.e., the sum of the elements on the main diagonal.

At Step 406, the regression parameter calculation module 204 initializes $\beta$ and $\tilde{u}_1, \ldots, \tilde{u}_M$. Here, $\beta$ is initialized to be about the reciprocal of the variance of $y_N$. $\tilde{u}_1, \ldots, \tilde{u}_M$ are each initialized to a value that is about 1/M thereof.

Note that $\tilde{u}_i$ represents the mode value of $u_i$. Throughout the description, $\tilde{u}_i$ means the same as:

$$\bar{u}_i, \qquad \text{[Formula 7]}$$

for the sake of notation.

At Step 408, the regression parameter calculation module 204 calculates $\Lambda, \mu, \tilde{u}_1, \ldots, \tilde{u}_M$, and $\beta$. $\Lambda$ and $\mu$, appearing herein for the first time, are an N×N matrix and an N-dimensional vector, respectively.

Specific contents of the calculation performed at Step 408 will be described by referring to the flowchart in FIG. 5.

Figure 5:
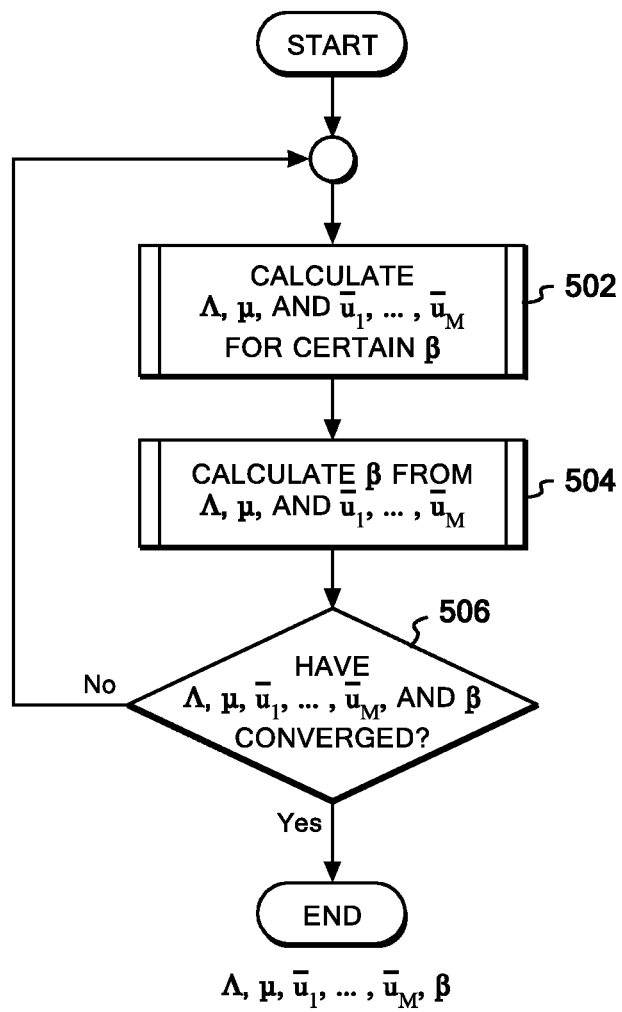
FIG. 5 is a diagram showing a flowchart of the regression parameter processing.
Figure 6:
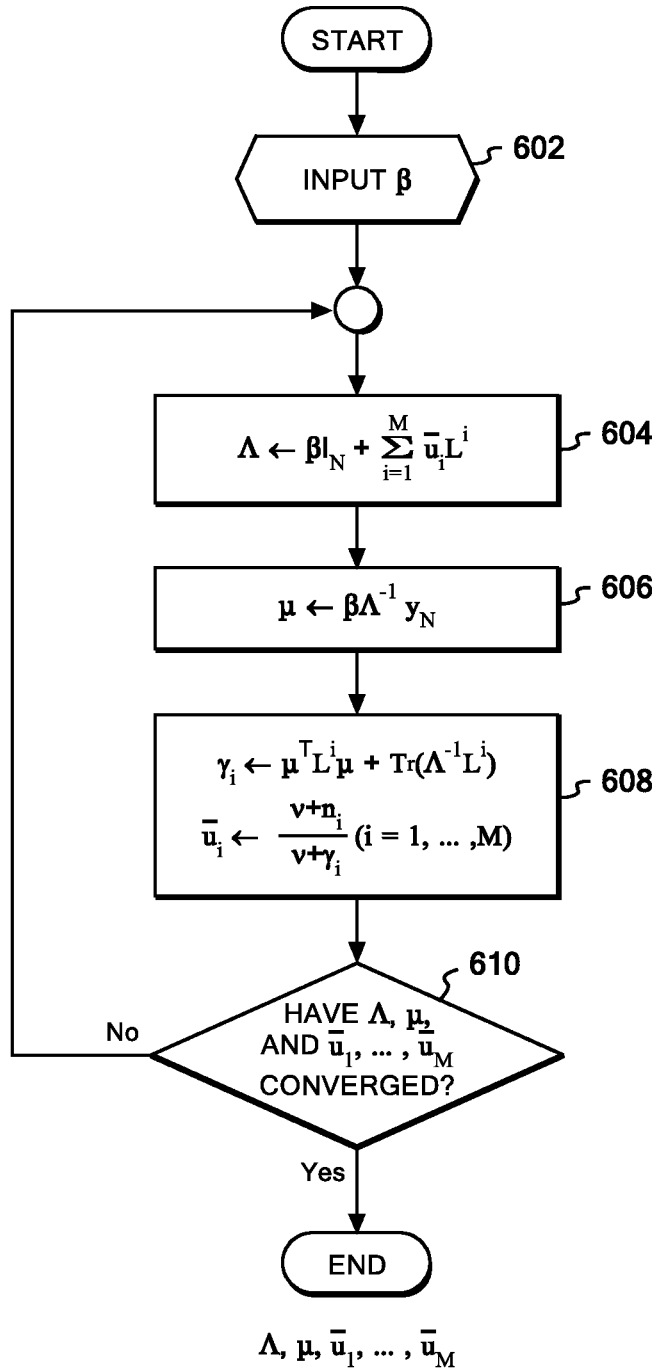
FIG. 6 is a diagram showing a flowchart of the regression parameter processing.

At Step 502 in FIG. 5, the regression parameter calculation module 204 calculates $\Lambda, \mu$, and $\tilde{u}_1, \ldots, \tilde{u}_M$ for certain $\beta$. Specific contents of this calculation will be described later by referring to the flowchart in FIG. 6.

At Step 504, the regression parameter calculation module 204 calculates $\beta$ from $\Lambda, \mu$, and $\tilde{u}_1, \ldots, \tilde{u}_M$. Specific contents of this calculation will be described later by referring to the flowchart in FIG. 7.

At Step 506, the regression parameter calculation module 204 determines whether or not $\Lambda, \mu, \tilde{u}_1, \ldots, \tilde{u}_M$, and $\beta$ have converged. Whether $\Lambda, \mu, \tilde{u}_1, \ldots, \tilde{u}_M$, and $\beta$ have converged or not is determined by comparing them with their corresponding values in the last calculation loop and checking whether or not the differences therebetween are smaller than predetermined thresholds.

If determining that $\Lambda, \mu, \tilde{u}_1, \ldots, \tilde{u}_M$, and $\beta$ have not converged, the regression parameter calculation module 204 returns to Step 502. On the other hand, if determining in Step 506 that $\Lambda, \mu, \tilde{u}_1, \ldots, \tilde{u}_M$, and $\beta$ have converged, the regression parameter calculation module 204 ends the processing, and the values of $\Lambda, \mu, \tilde{u}_1, \ldots, \tilde{u}_M$, and $\beta$ are settled.

Of the settled values, those of $\tilde{u}_1, \ldots, \tilde{u}_M$, and $\beta$ are set as the regression parameter 206 which the regression calculation module 210 can use.

Next, Step 502 in FIG. 5 will be described in detail by referring to the flowchart in FIG. 6. At Step 602 in FIG. 6, the value of $\beta$ is inputted to the regression parameter calculation module 204. The value of $\beta$ is the one prepared at Step 406 in FIG. 4.

At Step 604, the regression parameter calculation module 204 calculates matrix values in accordance with a formula below and inputs the values into $\Lambda$. As already mentioned, $\Lambda$ is an N×N matrix.

$$\Lambda \leftarrow \beta I_N + \sum_{i=1}^{M} \bar{u}_i L^i \qquad \text{[Formula 8]}$$

Here, $I_N$ is a unit N×N matrix.

At Step 606, the regression parameter calculation module 204 uses $\Lambda$ calculated at Step 604 to calculate $\mu$ in accordance with a formula below. As already mentioned, $\mu$ is an N-dimensional vector.

$$\mu \leftarrow \beta \Lambda^{-1} y_N$$

At Step 608, the regression parameter calculation module 204 calculates $\gamma_i$, and $\tilde{u}_i$ (i=1, ..., M) in accordance with a formula below.

$$\gamma_i \leftarrow \mu^T L^i \mu + Tr(\Lambda^{-1} L^i) \qquad \text{[Formula 9]}$$

$$\bar{u}_i \leftarrow \frac{\nu + n_i}{\nu + \gamma_i}$$

At Step 610, the regression parameter calculation module 204 determines whether or not $\Lambda, \mu$, and $\tilde{u}_1, \ldots, \tilde{u}_M$ have converged. Whether $\Lambda, \mu$, and $\tilde{u}_1, \ldots, \tilde{u}_M$ have converged or not is determined by comparing them with their corresponding values in the last calculation loop and checking whether or not the differences therebetween are smaller than predetermined thresholds.

If determining at Step 610 that $\Lambda, \mu$, and $\tilde{u}_1, \ldots, \tilde{u}_M$ have converged, the regression parameter calculation module 204 passes the values of $\Lambda, \mu$, and $\tilde{u}_1, \ldots, \tilde{u}_M$ to Step 504 in FIG. 5. In a case of no convergence, the processing returns to Step 604.

Figure 7:
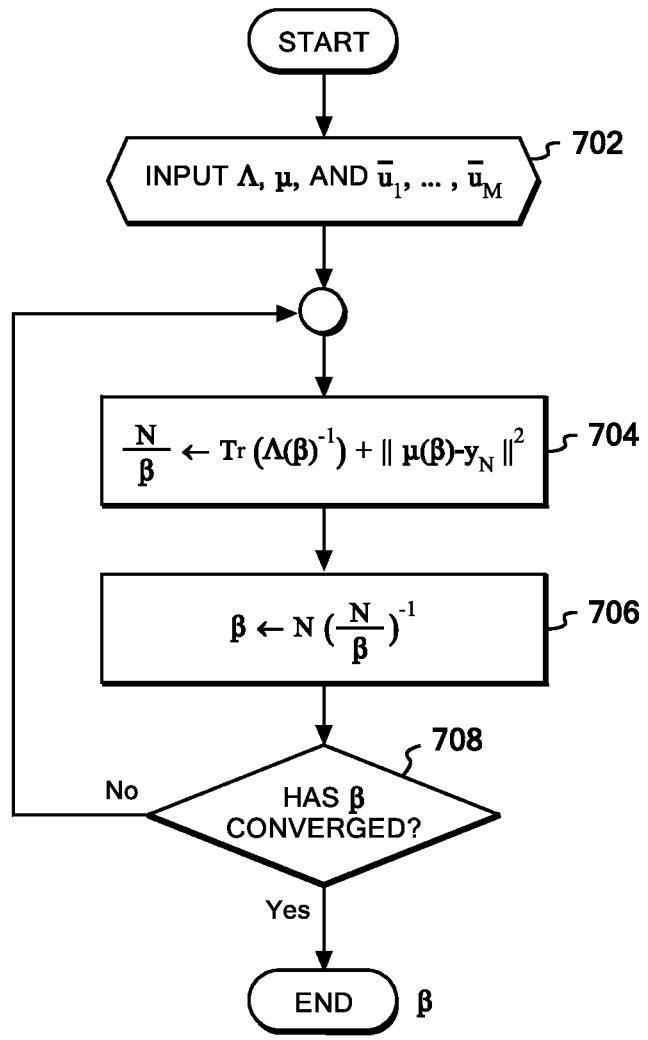
FIG. 7 is a diagram showing a flowchart of the regression parameter processing.

Next, Step 504 in FIG. 5 will be described in detail by referring to the flowchart in FIG. 7. At Step 702 in FIG. 7, the values of $\Lambda, \mu$, and $\tilde{u}_1, \ldots, \tilde{u}_M$ are inputted to the regression parameter calculation module 204. The values of $\Lambda, \mu$, and $\tilde{u}_1, \ldots, \tilde{u}_M$ are the ones actually prepared at Step 502 in FIG. 5, i.e., prepared in the processing shown in the flowchart of FIG. 6.

At Step 704, the regression parameter calculation module 204 calculates a value of $N/\beta$ in accordance with a formula below.

$$\frac{N}{\beta} \leftarrow Tr(\Lambda(\beta)^{-1}) + \|\mu(\beta) - y_N\|^{-1} \qquad \text{[Formula 10]}$$

At Step 706, the regression parameter calculation module 204 calculates a value of β from N/β in accordance with a formula below.

$$\beta \leftarrow N\left(\frac{N}{\beta}\right)^{-1} \qquad \text{[Formula 11]}$$

At Step 708, the regression parameter calculation module 204 determines whether or not β has converged. Whether β has converged or not is determined by comparing the value with its corresponding value in the last calculation loop and checking whether or not the difference therebetween is smaller than a predetermined threshold.

If the regression parameter calculation module 204 settles determines at Step 708 that β has converged, the value of β is settled. In a case of no convergence, the processing returns to Step 704.

As a result, Λ, μ, and $u^\sim_1, \ldots, u^\sim_M$ and β are all settled. Among these, the regression parameter calculation module 204 sets $u^\sim_1, \ldots, u^\sim_M$, and β to the regression parameter 206.

Next, processing performed by the regression calculation module 210 will be described by referring to the flowchart in FIG. 8.

What is obtained by this regression is a probability distribution of y with given input time-series data x. A predictive distribution over an unknown input can be provided generally by the following formula.

$$p(y \mid x, \text{data}) = \int du N(y \mid m_L, s_L^2) \prod_{i=1}^{M} g\left(u_i \mid \frac{\nu + n_i}{2}, \frac{\nu + \gamma_i}{2}\right) \qquad \text{[Formula 12]}$$

At the time when the training phase is finished, β, $n_i$ and $\gamma_i$ are prepared, and by setting ν to e.g., about 1, it is theoretically possible to calculate the above-described integration. However, the computational cost is large.

Thus, in view of the computational cost, it is reasonable to use an approximation, $p(y|x,\text{data}) = N(y|m_L(u^\sim), s(u^\sim)^2)$. This approximation is based on the Laplace Approximation described in Chapter 4 in Christopher M. Bishop's "Pattern Recognition and Machine Learning (Information Science and Statistics)" (Springer Science Media. LLC. 2006). This approximation is reasonable when N is large to some extent.

According to the above calculation, the predictive distribution can be described as below:

$$y = m_L(u^\sim)$$

The contents of the formula described above will be described below step by step.

Figure 8:
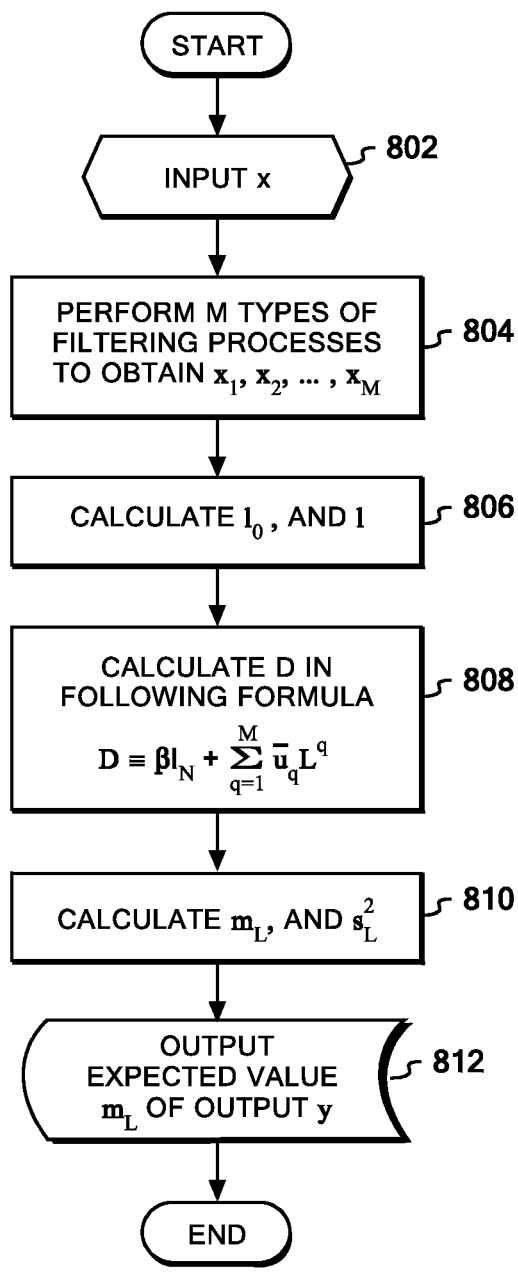
FIG. 8 is a diagram showing a flowchart of regression processing.

At Step 802 in FIG. 8, the regression calculation module 210 acquires time-series data x from the observation data 208.

At Step 804, the regression calculation module 210 filters the input time-series data x through M types of filters to create M time-series data sequences. In other words, a T-dimensional vector as below is formed for q=1, 2, ..., M (T is the number of data points on the time axis).

$$x_q \equiv [x_{q,1}, x_{q,2}, x_{q,3}, \ldots, x_{q,T}]^T \in R^T$$

Here, the time-series data pieces in the training data, which are filtered by the q-th filter, are set as $x_q^{(1)}, x_q^{(2)}, \ldots, x_q(T) \in R^T$.

Further, there is given a definition $a_q(x_q^{(i)}, x_q^{(j)}) \equiv A^q_{i,j}$.

After the above preparation, $I_0$ and I are calculated at Step 806 from the following formula.

$$I_0 \equiv \sum_{q=1}^{M} \bar{u}_q \sum_{n=1}^{N} a_q(x_q, x_q^{(n)}) \qquad \text{[Formula 13]}$$

$$l \equiv -\sum_{q=1}^{M} \bar{u}_q [a_q(x_q, x_q^{(1)}), a_q(x_q, x_q^{(2)}), \ldots, a_q(x_q, x_q^{(N)})]^T$$

At Step 808, the regression calculation module 210 calculates D from the following formula.

$$D \equiv \beta I_N + \sum_{q=1}^{M} \bar{u}_q L^q \qquad \text{[Formula 14]}$$

At Step 810, the regression calculation module 210 calculates $m_L$ and $s^2_L$ from the following formula.

$$m_L(u) = -\frac{\beta l^T D^{-1} y_N}{l_0 - l^T D^{-1} l} \qquad \text{[Formula 15]}$$

$$S_L(u)^2 = \frac{1}{\beta}\left[1 + \frac{\beta}{l_0 - l^T D^{-1} l}\right]$$

At Step 812, the regression calculation module 210 outputs the estimation value such as the expected value $m_L$ of the output y. The expected value $m_L$ is a probability distribution of y and displayed on the display 114 by the result calculation module 212 as needed.

Note that the embodiment described above employs a multi-kernel scheme in which different kernels are used for different filters filtering the time-series data; however, the present invention is not limited to such an embodiment. The present invention is applicable to various fields as long as what is to be handled is generally the similarity with a sample in training data—such as the prediction of a cost required to travel a certain route or the calculation of sales-potential scores of corporate clients—or a problem definable by the kernels. For example, in the case of the prediction of a cost required to travel a certain route, which is described in the description of Japanese Patent Application No. 2008-240351, the kernel matrix for the route can be considered equivalent to the similarity matrix described herein.

In addition, the hardware configuration illustrated above is merely an example, and the present invention can be used in any hardware environment, such as a multi-processor environment or a cloud-computing environment based on network connections.

What is claimed is:

1. A kernel regression learning method for calculating an estimation value, by use of a multiple kernel function learning method with training data including a plurality of different types of observation data and evaluation values thereof, the kernel regression learning method comprising the steps of:

calculating a similarity matrix for each of the different types of observation data;

calculating a graph Laplacian for each of the different types of observation data by use of the corresponding similarity matrix thus calculated;

providing an entire graph Laplacian as linear combination of the graph Laplacians with coupling constants; and calculating the coupling constants and a variance of an observation model of the observation data by use of a variational Bayesian method with the graph Laplacian, wherein the observation model is a normal distribution, latent variables for explaining the observation data form a normal distribution, and the coupling constants follow a gamma prior distribution; and wherein at least one of the steps is carried out by a computer device, wherein the observation data is time-series data and wherein each of the different types of observation data includes time-series data sequences obtained by filtering the time-series data through different filters, and wherein the different filters are configured to extract periodic components, to extract trend components and to extract residual components.

2. The method according to claim 1, wherein the step of calculating the coupling constants and the variance of the observation model includes a step of continuing to iterate calculation of the coupling constants from the variance of the observation model and calculation of the variance of the observation model from the coupling constants until the coupling constants and the variance of the observation model converge.

3. The method according to claim 1, further comprising a step of providing a distribution of evaluation values from given observation data by using the coupling constants and a value of the variance of the observation model.

4. A kernel regression learning system calculating an estimation value, by use of a multiple kernel function learning method with training data including a plurality of different types of observation data and evaluation values thereof, the kernel regression learning system comprising:

means for calculating a similarity matrix for each of the different types of observation data;

means for calculating a graph Laplacian for each of the different types of observation data by use of the corresponding similarity matrix thus calculated;

means for providing an entire graph Laplacian as linear combination of the graph Laplacians with coupling constants; and means for calculating the coupling constants and a variance of an observation model of the observation data by use of a variational Bayesian method with the graph Laplacian, wherein the observation model is a normal distribution, latent variables for explaining the observation data form a normal distribution, and the coupling constants follow a gamma prior distribution, wherein the observation data is time-series data and wherein each of the different types of observation data includes time-series data sequences obtained by filtering the time-series data through different filters, and wherein the different filters are configured to extract periodic components, to extract trend components and to extract residual components.

5. The system according to claim 4, further comprising means for causing the means for calculating the coupling constants and the variance of the observation model, to continue calculation of the coupling constants from the variance of the observation model as well as calculation of the variance of the observation model from the coupling constants, until the coupling constants and the variance of the observation model converge.

6. The system according to claim 4, further comprising a step of providing a distribution of evaluation values from given observation data by using the coupling constants and a value of the variance of the observation model.

7. A non-transitory computer readable storage medium tangibly embodying a computer readable program code having computer readable instructions which, when implemented, cause a computer to carry out the steps of a method, comprising:

calculating a similarity matrix for each of the different types of observation data;

calculating a graph Laplacian for each of the different types of observation data by use of the corresponding similarity matrix thus calculated;

providing an entire graph Laplacian as linear combination of the graph Laplacians with coupling constants; and calculating the coupling constants and a variance of an observation model of the observation data by use of a variational Bayesian method with the graph Laplacian, wherein the observation model is a normal distribution, latent variables for explaining the observation data form a normal distribution, and the coupling constants follow a gamma prior distribution, wherein the observation data is time-series data and wherein each of the different types of observation data includes time-series data sequences obtained by filtering the time-series data through different filters, and wherein the different filters are configured to extract periodic components, to extract trend components and to extract residual components.

8. The non-transitory storage medium according to claim 7, wherein the step of calculating the coupling constants and the variance of the observation model includes a step of continuing to iterate calculation of the coupling constants from the variance of the observation model and calculation of the variance of the observation model from the coupling constants until the coupling constants and the variance of the observation model converge.

9. The non-transitory storage medium according to claim 7, further comprising a step of providing a distribution of evaluation values from given observation data by using the coupling constants and a value of the variance of the observation model.

* * * * *